Patented May 1, 1934

1,957,244

UNITED STATES PATENT OFFICE 1,957,244

METHOD OF MAKING AMMONIUM CHLORIDE AND CALCIUM SULPHATE

Taylor A. Borradaile, Charleston, W. Va., assignor to Alkaline Earths Company, Charleston, W. Va., a copartnership consisting of Taylor A. Borradaile, Frederick J. Kaufman, and Benj. Preiser No Drawing. Application August 12, 1932, Serial No. 628,583

5 Claims. (Cl. 23—100)

My invention relates to a process for producing substantially pure ammonium chloride and calcium sulphate from substantially pure calcium chloride solutions, by the use of ammonium sulphate. Ammonium sulphate is a cheap and inexpensive product and can be purchased on the market at a comparatively low price, whereas ammonium chloride of the same grade as the ammonium sulphate has a very much higher market value, sometimes from three to six times that of the ammonium sulphate.

One of the objects of this invention is to produce from this substantially pure calcium chloride solution, substantially pure ammonium chloride and calcium sulphate. With that end in view, I add to the calcium chloride solution, one mol of ammonium sulphate for each mol of calcium chloride preferably in the presence of sufficient water to allow the resulting mixture of solids and liquid to flow and be easily filterable. The reaction that takes place is as follows:

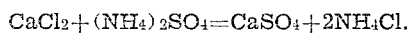
$$CaCl_2 + (NH_4)_2SO_4 = CaSO_4 + 2NH_4Cl.$$

The calcium sulphate precipitate is separated by filtering and washing and then carried through the usual processes to the finished product.

The filtrate now contains ammonium chloride and a small amount of soluble calcium sulphate. In order to free the filtrate from the soluble calcium sulphate, I add thereto a barium chloride solution in such amounts as is necessary to precipitate all the remaining sulphate as barium sulphate. The barium sulphate precipitate is then filtered from this solution in the usual manner and is purified by washing. The reaction is as follows:

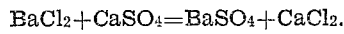
$$BaCl_2 + CaSO_4 = BaSO_4 + CaCl_2.$$

The filtrate contains all of the ammonium chloride in solution with a small amount of calcium chloride. By concentrating this solution and cooling to about 30° C. the ammonium chloride will crystallize out and the calcium chloride will remain in solution. The ammonium chloride crystals can be separated from the liquid by any of the usual processes and purified by either washing or recrystallization.

The mother liquor remaining after crystallization of the ammonium chloride will contain a high percentage of calcium chloride and a smaller amount of ammonium chloride. This liquor is an ideal reagent for supplying the ammonium chloride to the calcium magnesium chloride mixture of my aforesaid co-pending application, wherein I separate calcium and magnesium chlorides from each other.

From the above description it will be seen that I take two commercially cheap compounds, using calcium chloride as a source of chloride and ammonium sulphate as the source of sulphate and thereby produce the more expensive ammonium chloride as well as a high quality of calcium sulphate, by the addition of ammonium sulphate to the calcium chloride solution, separating part of the calcium sulphate by filtration and removing the balance of the sulphate by the addition of barium chloride solution. By concentrating the filtrate from the barium sulphate, upon cooling to about 30° C. the ammonium chloride crystals will separate from the solution.

The filtrate from the ammonium chloride separation containing some calcium chloride and some ammonium chloride is returned to other pure calcium chloride liquors which are to be treated with ammonium sulphate, or they may be returned to the calcium magnesium mixture mentioned in my co-pending application, in proportion to its ammonium chloride contents for the precipitation of magnesium ammonium chloride.

I claim:

1. The process of producing calcium sulphate and ammonium chloride by reacting in aqueous solution, calcium chloride and ammonium sulphate to produce precipitated calcium sulphate and an ammonium chloride solution and then separating the precipitate from the solution.

2. The process of reacting in aqueous solution, calcium chloride and ammonium sulphate to produce precipitated calcium sulphate and ammonium chloride, separating the precipitated calcium sulphate and treating the filtrate with barium chloride to precipitate any soluble sulphates as barium sulphate.

3. The process of reacting in aqueous solution, calcium chloride and ammonium sulphate to produce precipitated calcium sulphate and ammonium chloride, separating the precipitated calcium sulphate and treating the filtrate with barium chloride to precipitate any soluble sulphates as barium sulphate, filtering off the barium sulphate and concentrating the filtrate to recover the ammonium chloride.

4. The process which comprises treating a calcium chloride solution with ammonium sulphate to produce precipitated calcium sulphate and an ammonium chloride solution therefrom, separating the precipitated calcium sulphate, precipitating any soluble calcium sulphate in the ammonium chloride solution with barium chloride, as barium sulphate, and producing at the same time a solution of calcium chloride and ammonium chloride, crystallizing out the major part of the ammonium chloride to produce a residual liquor containing calcium and ammonium chlorides.

5. The process which comprises treating a calcium chloride solution with ammonium sulphate to produce precipitated calcium sulphate and an ammonium chloride solution therefrom, separating the precipitated calcium sulphate, precipitating any soluble calcium sulphate in the ammonium chloride solution with barium chloride, as barium sulphate, and producing at the same time a solution of calcium chloride and ammonium chloride.

TAYLOR A. BORRADAILE.